(12) United States Patent
Demas et al.

(10) Patent No.: US 9,852,771 B2
(45) Date of Patent: Dec. 26, 2017

(54) METHOD OF TIMEBASE MANAGEMENT FOR MPEG DECODING WITH PERSONAL VIDEO RECORDING FUNCTIONALITY

(71) Applicant: Avago Technologies General IP (Singapore) Pte. Ltd., Singapore (SG)

(72) Inventors: Jason Demas, Irvine, CA (US); Marcus Kellerman, Poway, CA (US); Sandeep Bhatia, Bangalore, CA (US); Srinivasa Mogathala Prabhakara Reddy, Bangalore, CA (US); Xuemin Chen, Rancho Sante Fe, CA (US); Vijayanand Aralaguppe, Bangalore, CA (US); Girish Raghunath Hulmani, Karnataka (IN); Pramod Chandraiah, Karnataka (IN); Ghanashyam Ananthamurthy Bailwal, Karnataka (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 91 days.

(21) Appl. No.: 14/193,798

(22) Filed: Feb. 28, 2014

(65) Prior Publication Data
US 2014/0178036 A1    Jun. 26, 2014

Related U.S. Application Data

(60) Division of application No. 10/174,355, filed on Jun. 18, 2002, now Pat. No. 8,676,025, which is a
(Continued)

(51) Int. Cl.
*H04N 5/935* (2006.01)
*H04N 5/94* (2006.01)
(Continued)

(52) U.S. Cl.
CPC ............ *G11B 27/10* (2013.01); *G11B 27/005* (2013.01); *H04N 5/76* (2013.01); *H04N 5/935* (2013.01);
(Continued)

(58) Field of Classification Search
CPC ...... G11B 27/005; G11B 27/10; H04N 19/44; H04N 21/4147; H04N 21/4305;
(Continued)

(56) References Cited

U.S. PATENT DOCUMENTS 5,473,385 A    12/1995 Leske
5,517,250 A *  5/1996 Hoogenboom ...... H04N 21/236
                                                 348/390.1
(Continued)

FOREIGN PATENT DOCUMENTS

EP    0798932    1/1997
EP    1093302    4/2001
(Continued)

OTHER PUBLICATIONS

Communication pursuant to Article 94(3) EPC corresponding to European Patent Application No. 03004685.8-1247, dated Oct. 21, 2008.
(Continued)

*Primary Examiner* — Gelek W Topgyal
(74) *Attorney, Agent, or Firm* — Foley & Lardner LLP

(57) ABSTRACT

Disclosed are various embodiments that facilitate recording to a storage medium in a personal video recorder (PVR) system. In one embodiment, a transport stream is received. The transport stream is stored into a memory. An index table is generated that provides information for locating particular frames recorded in the memory.

20 Claims, 6 Drawing Sheets

Related U.S. Application Data continuation-in-part of application No. 09/933,231, filed on Aug. 20, 2001, now Pat. No. 7,174,085, and a continuation-in-part of application No. 10/060,118, filed on Jan. 29, 2002, now Pat. No. 7,508,874.

(60) Provisional application No. 60/361,154, filed on Mar. 1, 2002.

(51) Int. Cl.

| | | |
|---|---|---|
| *G11B 27/10* | (2006.01) | |
| *H04N 5/76* | (2006.01) | |
| *H04N 9/79* | (2006.01) | |
| *H04N 21/4147* | (2011.01) | |
| *H04N 21/43* | (2011.01) | |
| *G11B 27/00* | (2006.01) | |
| *H04N 21/434* | (2011.01) | |
| *H04N 21/845* | (2011.01) | |
| *H04N 9/804* | (2006.01) | |
| *H04N 9/87* | (2006.01) | |
| *H04N 19/44* | (2014.01) | |
| *H04N 5/783* | (2006.01) | |

(52) U.S. Cl.
CPC ............... *H04N 5/94* (2013.01); *H04N 9/79* (2013.01); *H04N 9/7921* (2013.01); *H04N 9/8042* (2013.01); *H04N 9/87* (2013.01); *H04N 19/44* (2014.11); *H04N 21/4147* (2013.01); *H04N 21/4305* (2013.01); *H04N 21/4341* (2013.01); *H04N 21/8455* (2013.01); *H04N 5/783* (2013.01)

(58) Field of Classification Search
CPC .. H04N 21/4341; H04N 21/8455; H04N 5/76; H04N 5/783; H04N 5/935; H04N 5/94; H04N 9/79; H04N 9/7921; H04N 9/8042; H04N 9/87
USPC ............... 375/355, 359; 348/48, 66, 84, 111
See application file for complete search history.

(56) References Cited

U.S. PATENT DOCUMENTS

| | | | |
|---|---|---|---|
| 5,675,654 | A | 10/1997 | Ryan |
| 5,699,392 | A | 12/1997 | Dokic |
| 5,818,539 | A | 10/1998 | Naimpally et al. |
| 5,920,572 | A | 7/1999 | Washington et al. |
| 5,966,385 | A | 10/1999 | Fujii et al. |
| 6,115,422 | A | 9/2000 | Anderson et al. |
| 6,208,643 | B1 | 3/2001 | Dieterich et al. |
| 6,313,879 | B1 | 11/2001 | Kubo et al. |
| 6,363,207 | B1* | 3/2002 | Duruoz ............... H04N 5/04 348/423.1 |
| 7,174,085 | B2 | 2/2007 | Demas et al. |
| 7,508,874 | B2 | 3/2009 | Demas et al. |
| 2001/0022823 | A1 | 9/2001 | Renaud |
| 2003/0035650 | A1 | 2/2003 | Demas et al. |
| 2003/0066094 | A1 | 4/2003 | van der Schaar et al. |
| 2003/0142752 | A1 | 7/2003 | Demas et al. |
| 2003/0165196 | A1 | 9/2003 | Demas et al. |
| 2003/0206605 | A1 | 11/2003 | Anderson |
| 2003/0223735 | A1* | 12/2003 | Boyle ............... H04N 5/76 386/330 |

FOREIGN PATENT DOCUMENTS

| | | |
|---|---|---|
| WO | 01/22736 | 3/2001 |
| WO | 01/45426 | 6/2001 |
| WO | 01/52554 | 7/2001 |

OTHER PUBLICATIONS

Oliphant et al., "TV gets personal", R&D White Paper, BBC, Sep. 2001, pp. 9-13. Retrieved from the Internet: http://www.bbc.co.uklrd/pubs/whp/whp-pdf-files/WHP014.pdf.

R.E. Anderson, E.M. Foster: "Design of an MPEG-2 transport demultiplexor core," vol. 43, No. 4, Jul. 1999 pp. 521-532.

IBM: "MPEG CS24 High Performance AudioNideo Decoder", Oct. 12, 1999 (pp. 1-272).

* cited by examiner

METHOD OF TIMEBASE MANAGEMENT FOR MPEG DECODING WITH PERSONAL VIDEO RECORDING FUNCTIONALITY

CROSS-REFERENCE TO RELATED APPLICATIONS

This application is a divisional of, and claims priority to, U.S. patent application Ser. No. 10/174,355, entitled "METHOD OF TIMEBASE MANAGEMENT FOR MPEG DECODING WITH PERSONAL VIDEO RECORDING FUNCTIONALITY," and filed on Jun. 18, 2002. This application makes reference to, claims priority to and claims benefit from U.S. Provisional Patent Application Ser. No. 60/361,154, entitled "Time-Base Management for MPEG Decoding with Personal Video Recording (PVR) Functionality," filed on Mar. 1, 2002. This application makes reference to, claims priority to and claims benefit from U.S. patent application Ser. No. 09/933,231, entitled "Apparatus and Method of Seamless Switching between a Live DTV Decoding and a PVR Playback," filed on Aug. 20, 2001. This application makes reference to, claims priority to and claims benefit from U.S. patent application Ser. No. 10/060,118, entitled "Error Concealment for MPEG Decoding with Personal Video Recording Functionality," filed on Jan. 29, 2002.

The above-referenced U.S. applications are hereby incorporated by reference in their entirety.

BACKGROUND

A Personal Video Recorder (PVR) system offers consumers a hard disk or a network-based video cassette recorder (VCR) that digitally records live television (TV) programs while offering the versatility of select playback and associated special features. Live sources for a PVR system include a live digital broadcast and a live analog broadcast.

The coordination between recording and playback of programming can result in a number of timing issues. For example, the PVR system may pause its playback for a significant duration upon receiving a substantial discontinuity in its received time references. In another example, playback and recording buffers can overflow or underflow during simultaneous playback and recording. In addition, it would be advantageous for smooth playback or for manipulating the content of the video stream if an efficient method and system were developed that could determine quickly where particular picture frames were located in memory.

Further limitations and disadvantages of conventional and traditional approaches will become apparent to one of ordinary skill in the art, through comparison of such systems with the present invention as set forth in the remainder of the present application with reference to the drawings.

BRIEF SUMMARY OF THE INVENTION

Aspects of the present invention may be found in systems and methods that use timebase management for moving pictures experts group (MPEG) decoding with personal video recording (PVR) functionality. In one embodiment, the present invention may provide a method for live decoding in a PVR system. The method may include the steps of receiving at least one data packet; determining at least one program clock reference (PCR) using the at least one data packet; and locking a timing mechanism to the at least one determined PCR.

In another embodiment, the present invention may provide a method for handling PCR discontinuities during a live decode in a PVR system. The method may include the steps of receiving a PCR from an incoming transport packet; checking whether a discontinuity bit of the transport packet has been set; and if the discontinuity bit has been set, then updating system time clocks (STCs) with the received PCR and decoding remaining transport packets corresponding to an old timebase.

In another embodiment, the present invention may provide a method for recording to a storage medium in a PVR system. The method may include the steps of receiving a transport stream; storing the transport stream into a memory; and generating an index table that provides information for locating particular frames recorded in the memory.

In yet another embodiment, the present invention may provide a method for playback from a storage media in a PVR system. The method may include the steps of programming a voltage controlled crystal oscillator (VCXO) to a nominal frequency; configuring a data transport engine to playback a transport stream from a memory; configuring a video decoder to decode with throttle control; configuring the video decoder for timebase management mode; and initializing a video STC with a presentation time stamp (PTS).

In yet still another embodiment, the present invention may provide a method for recording and playing simultaneously in a PVR system. The method may include the steps of configuring a data transport engine to record a transport stream; generating an index table that provides information for locating particular frames of the transport stream stored in a memory; controlling a VCXO as a function of error between a PCR in the transport stream and a serial PCR local STC; configuring the data transport engine to playback recorded transport stream from the memory; configuring a video decoder to decode at different decoding rates; configuring a video decoder for timebase management mode; and updating the video STC with a PTS.

These and other advantages and novel features of the present invention, as well as details of illustrated embodiments thereof, will be more fully understood from the following description and drawings.

DETAILED DESCRIPTION

Figure 1:
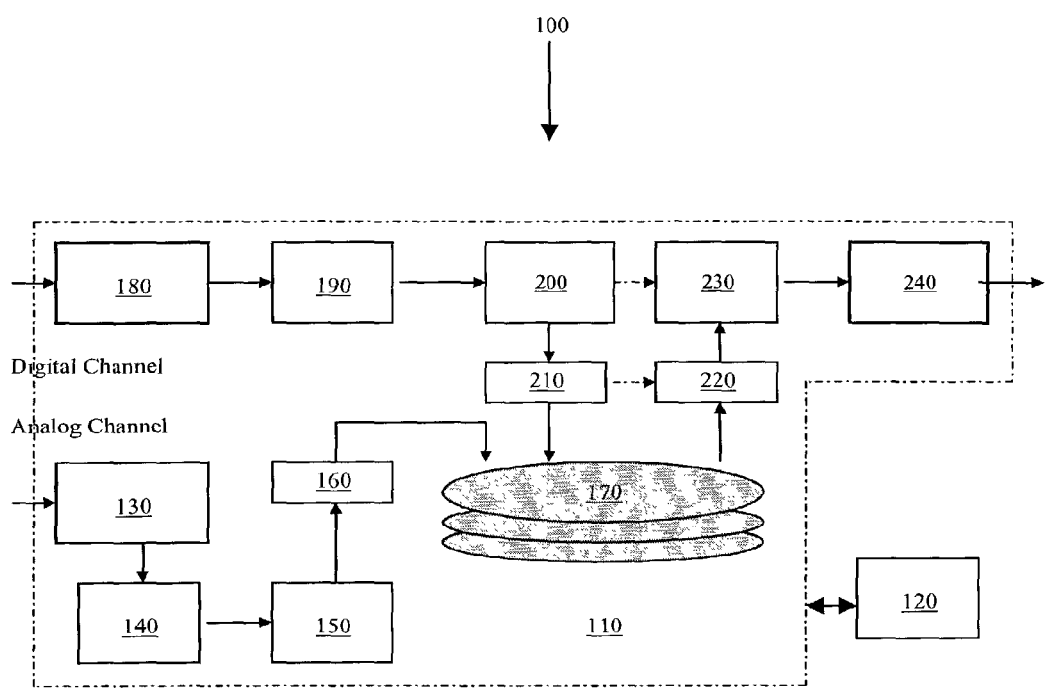
FIG. 1 shows an example of a personal video recorder system according to the present invention.

FIG. 1 shows an example of a personal video recorder (PVR) system according to the present invention. The personal video recorder (PVR) system 100 may include, for example, a PVR module 110 coupled to a host processor 120. The PVR module 110 may include, for example, an analog demodulator 130, a video decoder (VDEC) 140, a moving pictures experts group (MPEG) encoder 150, a first-in-first-out (FIFO) buffer 160, a hard drive 170, a digital demodulator 180, a forward error correction (FEC) decoder 190, an MPEG data transport processor 200, a FIFO buffer 210, a FIFO buffer 220, an MPEG video decoder 230 and a display processor 240. The couplings and interactions between the various PVR system components and the operation of the PVR system are disclosed in the above-referenced incorporated applications and will not be described in detail herein. The scope of the present invention is not limited by the illustrated example. For example, the present invention is not limited to a hard drive, but may employ in addition to or instead of a hard drive any of the following examples: an optical storage device, a magnetic storage device, an electrical storage device, a network or combinations thereof. In addition, the present invention is not limited to the illustrated embodiment, but may also include, for example, other embodiments, parts or aspects thereof also disclosed in the incorporated applications. Thus, for example, the PVR system 100 may also include an audio buffer, an audio decoder and an audio output device which may or may not be integrated, at least in part, with corresponding video components. Furthermore, although the present invention may find applications as part of or in conjunction with a set top box, the present invention need not be so limited. The present invention may find application, for example, in the front end portion or the head end portion of a system or network. Thus, for example, the present invention may be employed in the head end portion of a video-on-demand server.

Figure 2:
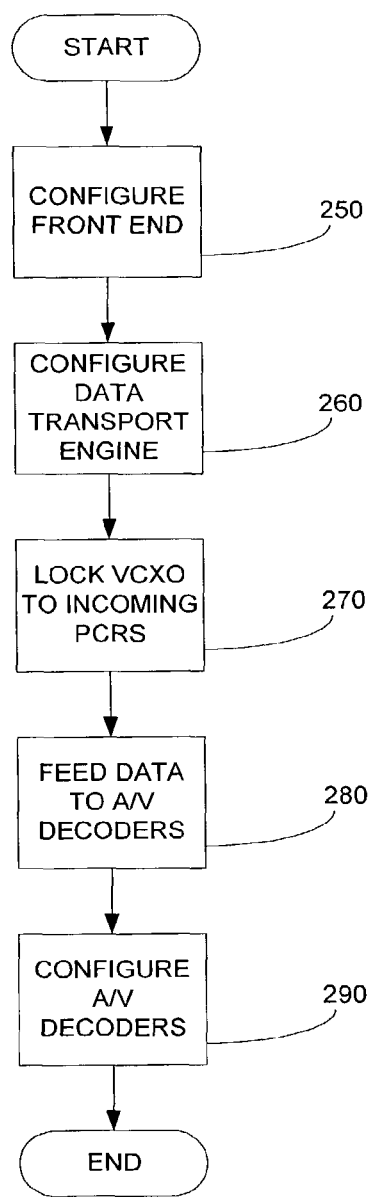
FIG. 2 shows a flowchart illustrating an example of a process for live decoding according to the present invention.

FIG. 2 shows a flowchart illustrating an example of a process for live decoding according to the present invention. The process begins, in step 250, by configuring the front end. Configuring the front end may include, for example, configuring the front end interface (e.g., a set top box input interface or port, a PVR system input interface, etc.) that receives an analog or a digital signal via a cable or wirelessly via an antenna or a receiver. In one example, the front end is adapted to receive analog modulated input signals or digital modulated input signals. In one example, the front end may include a transceiver or a receiver that has a signal conditioner (e.g., a tuner) that can be adapted for receiving signals that have been modulated using quadrature amplitude modulation (QAM) or Quadrature Phase Shift Keying (QPSK). The present invention may also contemplate other forms of modulation including, for example, vestigial side band (VSB), orthogonal frequency division multiplexing (OFDM), synchronous code division multiple access (SCDMA), frequency modulation (FM), amplitude modulation (AM), etc.

In step 260, the data transport engine is configured. The configuring of the data transport engine may include, for example, configuring the package or packet identifier (PID) parsers to filter out any program specific information (PSI) packets or messages that the transport stream may contain. The configuring of the data transport engine may also include, for example, configuring the descrambler to remove any network encrypting of the transport stream or configuring the timing recovery circuit. The timing recovery circuit may be configured to update the video system time clock (STC), the audio STC and the timing recovery circuit STC. In one example, the timing recovery circuit may be a block of hardware designed specifically to manage the absolute and the relative timebase for the video and audio components during live and playback operations. In addition, the timing recovery circuit may be programmable. For example, the timing recovery circuit may be configured to initialize the STCs when the first program clock reference (PCR) is received from the transport stream. The timing recovery circuit may also be configured to interrupt the host upon identifying a marked or an unmarked PCR discontinuity (i.e., if a PCR error larger than a programmable amount occurs). The host may then reload the STCs with a PCR in the transport stream to support the PCR discontinuity.

In step 270, a timing mechanism may be locked to the incoming PCRs. The timing mechanism may include, for example, a voltage controlled crystal oscillator (VCXO), a crystal or another clock source. In one example, the VCXO may be locked to the incoming PCRs. In another example, the VCXO may be driven by the timing recovery circuit as a function of the error between the PCR in the transport stream and timing recovery circuit STC. The VCXO may be driven to oscillate within a programmable range by the timing recovery circuit. In one example, the VCXO is an approximately 27 MHz VCXO. Another timing mechanism can be achieved by internally handling the timebase digitally and by sample-rate converting the video/audio onto the new timebase right before the digital-to-analog (D/A) converters.

In step 280, data is fed to the audio decoder and the video decoder. For example, after the transport stream has been filtered and decrypted, a single program transport stream may be sent, possibly simultaneously, to the video decompression engine and the audio decompression engine.

In step 290, the audio decoder and the video decoder are configured. In one example, the video decoder is configured to startup in timebase management mode. During configuration, the video decoder may wait for a presentation time stamp (PTS) in the stream equal to its STC (i.e., within a programmable window). Thus, until its STC has been initialized, the video decoder may not typically decode and display images in timebase management mode. Once the new STC from the timing recovery circuit is sent to the video decoder, the PTS in the stream becomes valid (i.e., assuming the stream has accurate PCRs and video decoding may begin). The present invention also may contemplate using a decode time stamp (DTS) instead of or in combination with the PTS. In one example, the DTS is used instead of the PTS and picture ordering is accounted for or considered.

The video decompression engine may be configured to begin decoding the proper PID in timebase management mode. Accordingly, pictures may be displayed when the corresponding PTS is equal to the video decoder STC. A PTS mature interrupt may be sent from the MPEG decoder to the host when a picture is ready for display. Until the host receives the interrupt, the display engine is configured by the host not to display the picture. This may be advantageous in assuring that nothing is displayed without the PTS first maturing. As soon as the first frame's PTS matures and is displayed, the video decompression engine interrupts the host with the PTS mature interrupt to verify the video display elements of the graphics engine are not updated until the MPEG video is ready for display.

The video decompression engine may be configured to interrupt the host when a PTS is outside of a particular programmable window around the STC. The interrupt may, for example, not be sent until the STC has been initialized. This configuration may allow the host to reprogram the STC if there are problems with the stream. The video decompression core may also be configured to interrupt the host with an MPEG sequence header interrupt when it sees a valid sequence header. Thus, the host may access useful display information such as, for example, the video format.

To allow graphics to be displayed without tearing on the display during channel change of the video content, the display vertical sync may be frequency locked, although not necessarily phase locked to the desired presentation time of video in the MPEG decompression core. To allow for perfect audio/visual synchronization in this environment, the MPEG core may record for the host to access the offset between the desired presentation time and the actual presentation time. Because the vertical sync may be guaranteed to be frequency locked since it may have been created from the same 27 MHz VCXO as the video decoder STC, this value may be a constant for a given channel acquisition.

After the host receives the PTS mature interrupt from the video decoder, the host may read the video presentation time offset from the video decompression engine. The audio may be acquired with the audio PTS offset programmed to be the video presentation time offset. This may have an advantage of ensuring audio/visual synchronization. Video and audio may thus run seamlessly with audio/visual synchronization.

Figure 3:
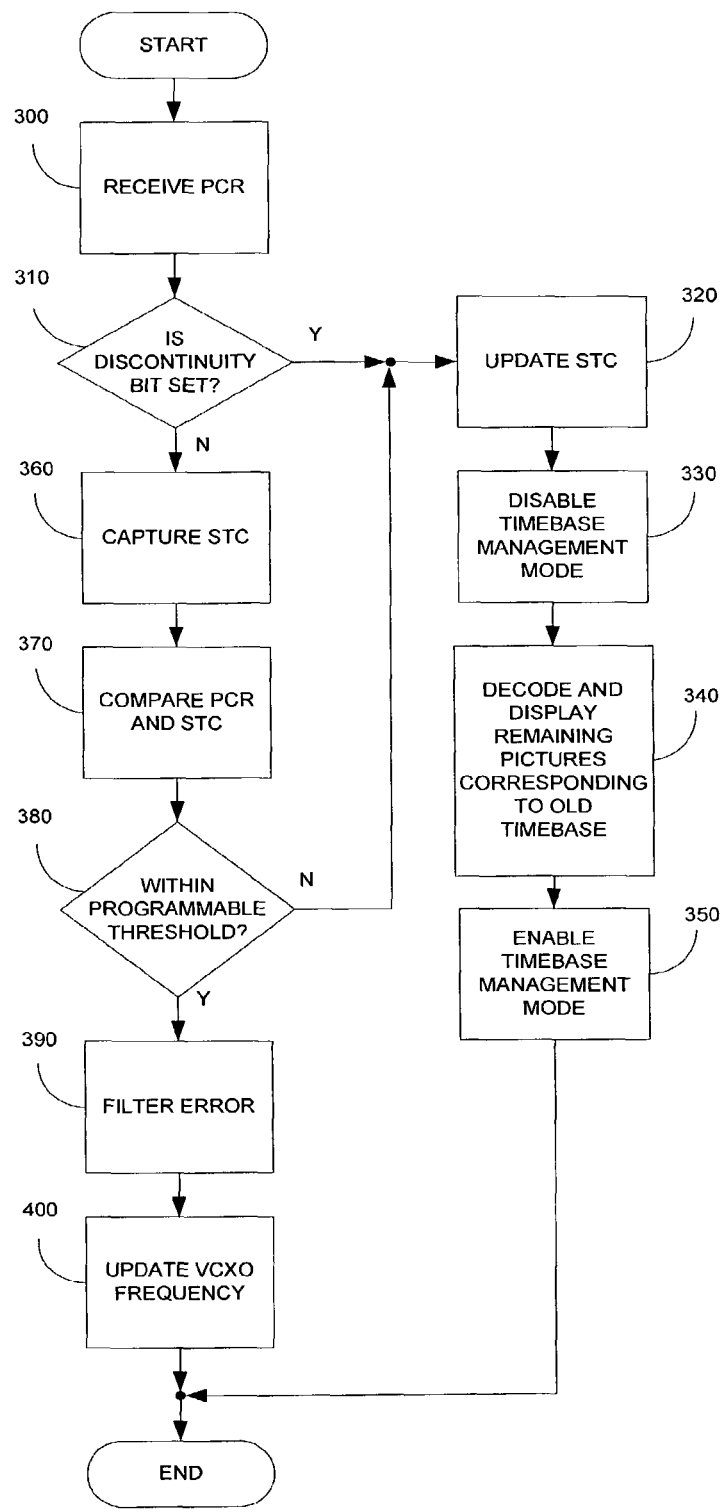
FIG. 3 shows a flowchart illustrating an example of a process for dealing with a program clock reference discontinuity according to the present invention.

FIG. 3 shows a flowchart illustrating an example of a process for handling a PCR discontinuity according to the present invention. In step 300, a new PCR is received from the transport stream and may be monitored, for example, by the timing recovery circuit. In query 310, it is determined whether a discontinuity bit has been set. In one example, the MPEG specification is used and suggests that, if a change in the PCR timebase occurs such that a local STC should be reloaded (e.g., the host should reload its STC), then the transport stream should indicate this circumstance to the decoder by setting a PCR discontinuity bit in the transport packet header. If the PCR discontinuity bit is set, then, in step 320, the timing recovery circuit may automatically update or may be programmed to automatically update, for example, the video STC, the audio STC and its own STC with the new PCR value. In step 330, when the video decoder core receives the STC update, it may automatically disable the timebase management mode. In step 340, the disabling of the timebase management mode may then, for example, allow pictures, based on the previous timebase before the PCR discontinuity, to continue to be decoded out of the video buffer and to be displayed. In step 350, once the pictures based on the previous timebase are decoded and displayed, the video decoder core may automatically switch back to the timebase management mode of operation. Also, in one example, since the audio decoder core checks for PTS maturity as data is sent into the audio buffer, the audio decoder core may be able to seamlessly handle the update. The present invention also may contemplate that video may check the PTS before or after data is sent to the video buffer and that the audio may check the PTS before or after data is sent to the audio buffer. In one example, the audio and the video may check concurrently.

If the PCR discontinuity bit is not set, then, in step 360, in one example, the timing recovery circuit captures the its STC. In step 370, the new PCR is compared with the STC of, for example, the timing recovery circuit. The absolute value of the difference between the new PCR and the STC may be calculated. In query 380, it is determined whether the calculated error between the new PCR and the STC of the timing recovery circuit is within a programmable threshold. In one example, the timing recovery circuit may detect the error between the new PCR and its STC and determine whether or not the calculated error is within a programmable threshold.

If the calculated error is not within the programmable threshold, then an unmarked PCR discontinuity event has occurred, the host is interrupted and the process jumps to steps 320-350 as described above. In one example, the timing recovery circuit may provide a PCR error interrupt to the host and, in particular, the host processor, in response to the unmarked PCR discontinuity event.

If the calculated error is within the programmable threshold, then the error is filtered, in step 390, and the VCXO frequency is updated in step 400. For example, the VCXO may have its frequency programmed as a function of the new PCR or the calculated error.

Figure 4:
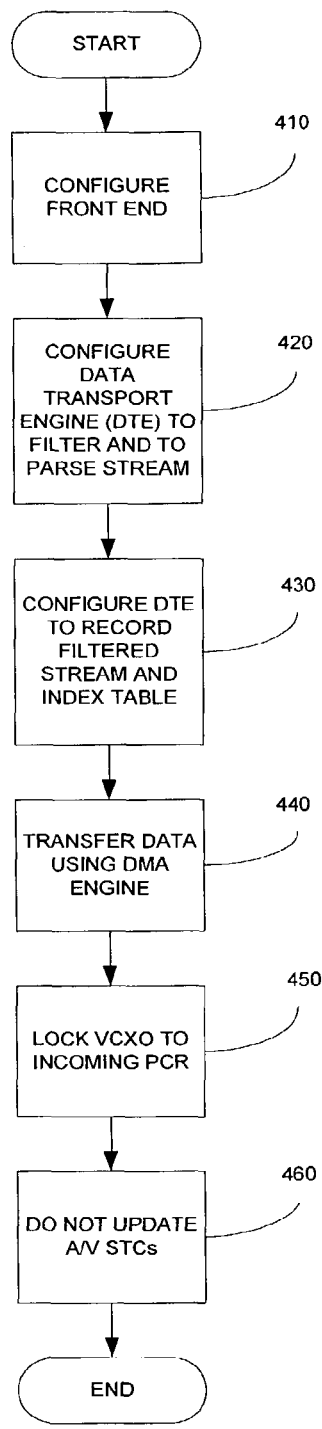
FIG. 4 shows a flowchart illustrating an example of a recording process according to the present invention.

FIG. 4 shows a flowchart illustrating an example of a recording process according to the present invention. In step 410, the front end is configured to acquire the transport stream. In step 420, the data transport engine is configured. Steps 410 and 420 are similar to steps 250 and 260 of the process for live decoding and are not described in further detail.

In one example, instead of sending a resulting single program transport stream to the video decoder and the audio decoder, the transport stream is sent to one of the recording channels. In step 430, the filtered stream and an index table (e.g., a picture index table) are recorded. In one example, the record buffer is configured as a linked list of descriptors. While the stream is being recorded, an index table pointing to start codes in the transport stream may be created and written into a linked list of descriptors. The index table may be used, for example, to inform the host of the locations of pictures in the stream and to allow the host to remove pictures when applicable during the operation of some of the trick modes without parsing the entire stream in software. In step 440, the record buffers (e.g., which may be part of a unified synchronous dynamic random access memory (SDRAM)) are evacuated to a storage unit (e.g., a hard disk) as needed. The record buffers may include memory such as, for example, dynamic random access memory (DRAM), SDRAM, double data rate synchronous dynamic random access memory (DDR-SDRAM), extended data output dynamic random access memory (EDO-DRAM), rambus dynamic random access memory (RDRAM), etc. For example, the recording client process may be configured to evacuate the record buffers as needed and to store the data on a file server. A direct memory access (DMA) engine may be used to transfer the data from the record buffers to the storage unit. In step 450, the timing recovery circuit is configured to lock the new timebase (e.g., the 27 MHz VCXO) to the incoming PCR from the transport stream that is being recorded. The present invention also may contemplate locking the new timebase to, for example, a fixed value, a live digital channel or a live analog channel. In one example, step 450 occurs if the broadcast decode is not active and if the PCR PID exists. In step 460, the audio STC and the video STC are not updated. The timing recovery circuit may be programmed not to send STC values to the audio decoder and the video decoder.

The general data flow for playing video back from, for example, a hard disk is based, in part, on a design for live decoding as described above. However, some differences include, for example, that, during playback, the PCRs present in the stream may not provide a viable time source. In part, this may be because playback from a file server may be bursty and not the constant bit rate typically needed for PCR integrity. This problem may be solved, for example, by employing a pull-type, as opposed to a push-type, architecture for decode timebase management.

Figure 5:
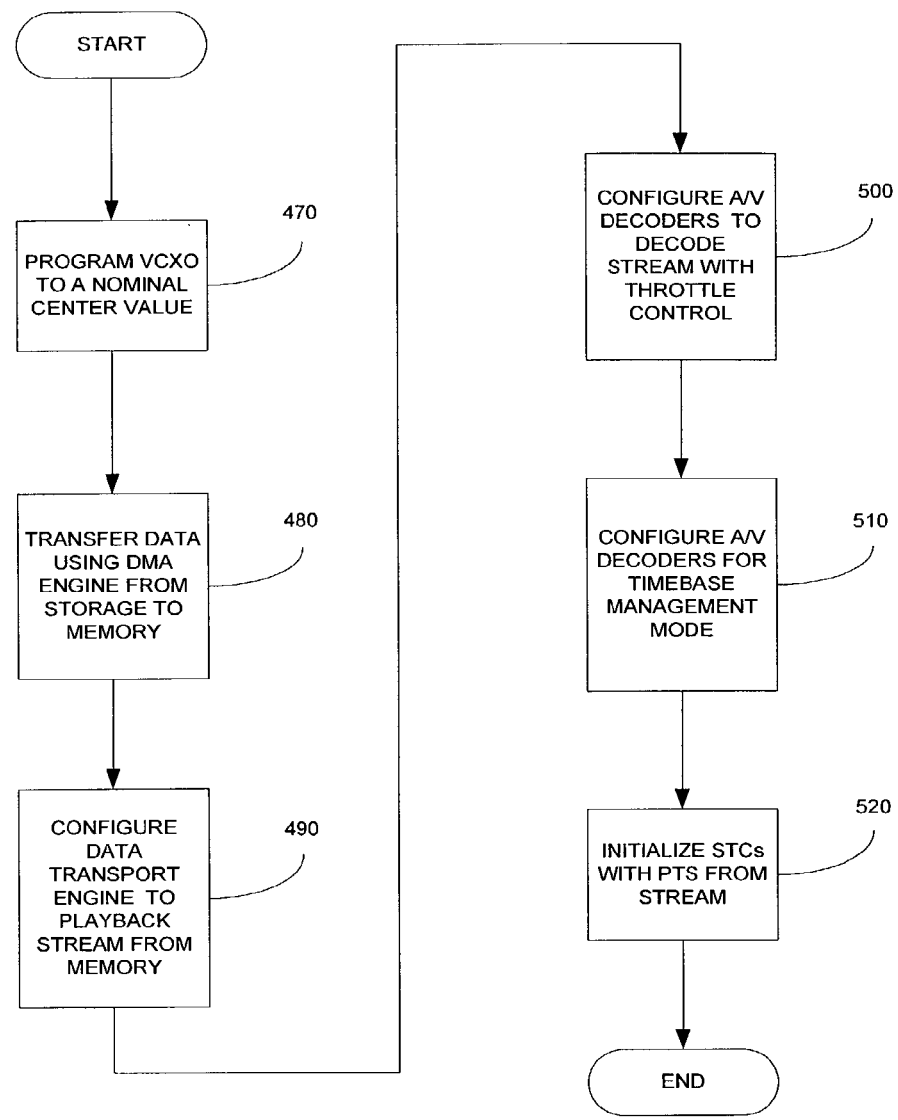
FIG. 5 shows a flowchart illustrating an example of a playback process according to the present invention.

FIG. 5 shows a flowchart illustrating an example of a playback process according to the present invention. In the case of playback from a storage media, the PCRs present in the stream may not be used as a viable time source with which to set a timebase. In step 470, the new timebase (e.g., the 27 MHz VCXO) may be programmed to a nominal center value. Thus, the display timebase may be fixed and may allow for a pull-type data flow. The present invention also may contemplate locking the new timebase to, for example, a fixed value, a live digital channel or a live analog channel. In step 480, the playback process may optionally employ, for example, DMA engines in the transfer of data from memory (e.g., SDRAM) to a storage unit (e.g., a hard disk or file server).

In step 490, the data transport engine is configured for playback. In one example, the data transport engine is configured to playback data out of buffers in the unified SDRAM memory. The location of the buffers from which the data may be retrieved is configured as a linked list of descriptors. The configuring of the data transport engine may include, for example, configuring the data transport engine to send the playback data either directly to the video decompression engine and audio decompression engine or through the parsers and the descrambler on the way to the decompression engines. An advantage of moving the signal through the parsers and the descrambler may be that the host can then monitor PSI packets and messages in the stream while decoding as well as optionally descrambling the signal. Thus, signals may be recorded with native encryption. In one example, three transport signals move through the parsers and the descrambler engine simultaneously, so a transport stream that does not need to be filtered or descrambled may nominally be played directly to the audio and video decoder, thus saving the three parser inputs for other transport streams (e.g., live transport streams).

The playback client may be enabled to begin filling the playback buffers in SDRAM with data from the file server. Since the stream has already been filtered during record, the data may be immediately read from the playback buffers and sent, for example, to the video decompression engine via the data transport engine or to video or audio directly for decode and display.

In step 500, the audio decoder and the video decoder are configured to decode the stream with throttle control. In one example, during playback, the playback client may be throttled to ensure buffers in the video decompression engine and the audio decompression engine do not underflow or do not overflow. Thus, the video decompression engine and the audio decompression engine may each include a pause signals line which, when enabled, is capable of pausing the flow of information from the data transport engine when, for example, the buffers have reached or exceeded a particular threshold. If both the video pause signal line and the audio pause signal line are enabled, then the data transport engine may stop supplying data if either of the two pause lines is set. If video is to be decoded, then the video pause signal line should be enabled. If audio is to be decoded, then the audio pause signal line should be enabled. If both video and audio are to be simultaneously decoded, then both pause signal lines should be enabled.

In step 510, the audio decoder and the video decoder are configured for timebase management mode. Just as in the case of live decoding, the video decompression engine may be configured to begin decoding the proper PID in timebase management mode. Because the video core is configured to start in timebase management mode, video may not begin to be decoded until the STC has been initialized and a PTS error interrupt may not be generated until the STC has been initialized by the host. The video decoder may not discard or display frames arriving from the playback channel until the first STC update arrives from, for example, the timing recovery circuit. As in live decode, the video decompression engine may interrupt the host with a sequence header interrupt as soon as the first valid sequence header is seen so that the host may access video format information.

In step 520, the STCs are initialized with PTS. When the first PTS is observed in the incoming transport stream, the video decode engine interrupts the host so that the STC can be initialized correctly the first time. After receiving the first PTS interrupt, the host reads the most recent PTS received by the video decompression core and writes this value to the timing recovery circuitry, thereby configuring the timing recovery circuit to initialize the STCs with this value. With the video STC initialized, for example, the video decode may begin smoothly once the first PTS matures. In one example, the audio and video playback are locked together. However, if only the audio playback is in progress, then the PTS value from the audio decoder may be used to set the STC. As soon as the first PTS matures, the PTS mature interrupt is sent to the host so that the host may configure the display accordingly. As with live decode, the host may read the video presentation time offset from the video decompression engine and may use it as the audio PTS offset during audio acquisition to ensure audio/video synchronization.

Playback mode may support marked and unmarked discontinuities in the timebase. Instead of relying on the timing recovery circuit to detect timebase jumps in the PCRs as may occur in live decode, the video decompression engine during playback may be configured to interrupt the host every time a PTS to STC difference is larger than a programmable amount. If this interrupt is received, the host may read the last PTS seen by the video and may use that value to force the timing recovery circuit to synchronously update the STCs (e.g., the audio STC and the video STC), thus allowing for a smooth timebase transition. Further details about these and related processes can be found in the above-referenced patent applications that have been incorporated by reference in their entirety.

An application of PVR technology is the watch and record mode (i.e., watching and recording the same live program). This application is capable of implementing trick modes (e.g., pause/still, fast forward, slow forward, rewind, slow reverse, skip, etc.) on live broadcasts. If the watched and the recorded programs are from different content streams (i.e., watching program A and recording program B), the playback is configured just as a standard playback while the record is configured just as a standard record. In another example, the watched and recorded programs are time-shifted versions of the same stream (e.g., by pausing live broadcasts).

Figure 6:
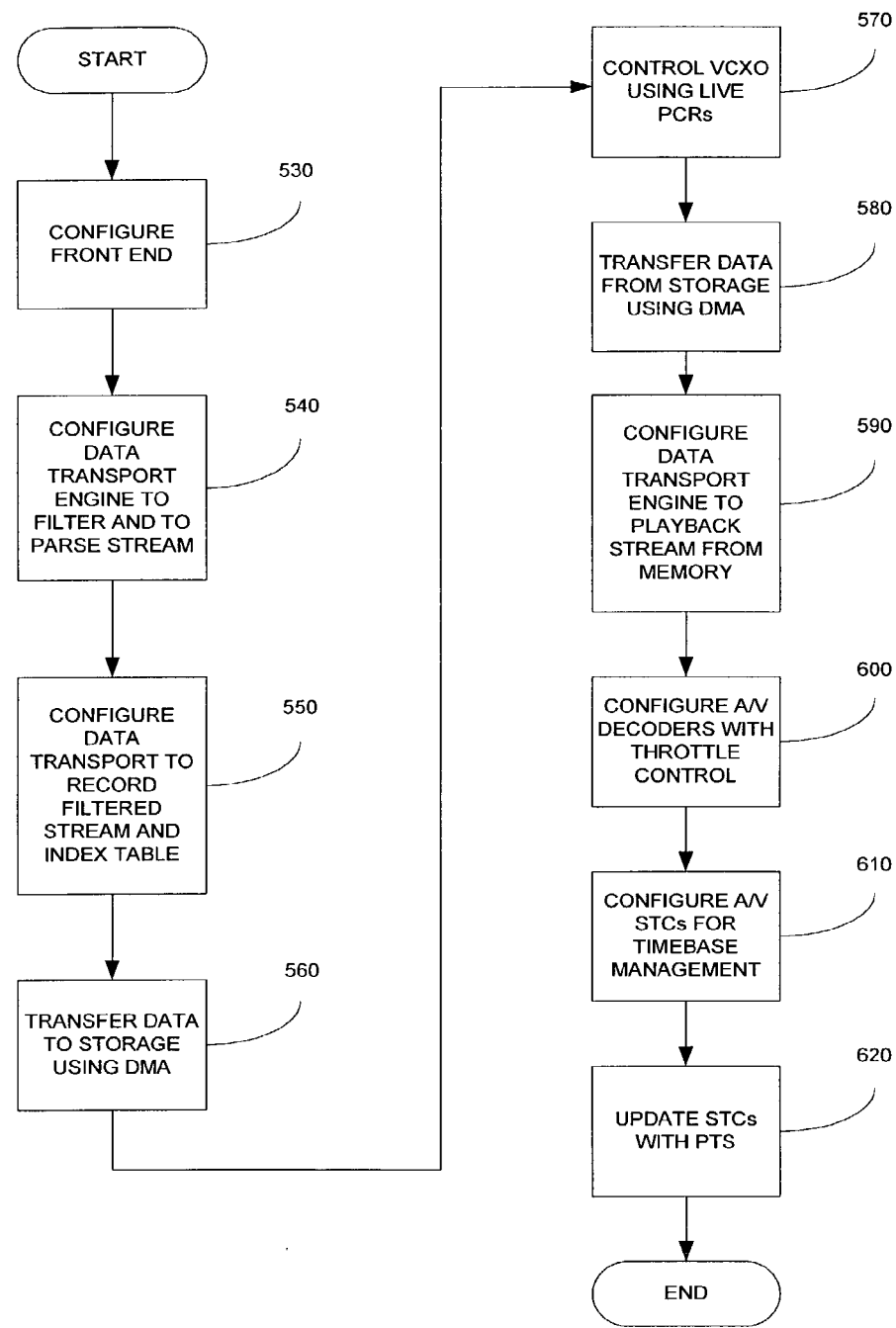
FIG. 6 shows a flowchart illustrating an example of a process for simultaneously watching and recording a program according to the present invention.

FIG. 6 shows a flowchart illustrating an example of a process for simultaneously watching and recording the same program according to the present invention. In one example, the program that is watched is a time-delayed version of the live program. The time-delayed version of the live program may also be manipulated using other trick modes. The recording process is configured, for the most part, as the above-described recording process. In step 530, the front end is configured, for example, to acquire the transport stream. In step 540, data transport engine is configured, for example, to filter and to parse the transport stream. In step 550, the filtered stream and an index table (e.g., a picture index table) are recorded into memory or storage. In step 560, the recording process may optionally employ a DMA engine to transfer data from memory to storage. Steps 530-560 and other steps have been previously described with regard to the recording process and are not further detailed.

In one example, the playback mechanism may be configured, for the most part, for standard playback. One of the differences, however, is that to keep the buffers from overflowing or from underflowing, the display timebase may be locked to the incoming live stream as it is being recorded. Thus, in one example, instead of freezing the 27 MHz VCXO (e.g., locking the VCXO to a nominal center frequency) as may be done in some examples of normal playback, the timing recovery circuit may be configured to drive the VCXO as a function of the error between PCRs in the original live broadcast stream (i.e., the broadcast stream before recording) and the serial PCR local STC (step 570). The VCXO may be driven by the PCRs in the original live broadcast stream, as opposed to the PCRs in the playback stream which may have a disadvantage of being bursty. In step 580, the playback process may optionally employ a DMA engine to transfer data from memory to storage. In step 590, the data transport engine is configured to playback the stream from memory. In step 600, the audio decoder and the video decoder are configured to decode the stream with throttle control. In step 610, the audio STC and video STC are configured for timebase management. Steps 580-610 and other steps have been previously described with regard to the playback process and are not further detailed. In step 620, the STCs are updated by the PTS and not by the live stream. In one example, the send STC feature of the timing recovery circuit is disabled to avoid sending the record timebase to the audio decoder and the video decoder.

Thus, it is seen that systems and methods for timebase management for MPEG decoding are provided. One skilled in the art will appreciate that the present invention can be practiced by other than the preferred embodiments which are presented in this description for purposes of illustration and not of limitation, and that the present invention is limited only by the claims that follow. It is noted that equivalents for the particular embodiments discussed in this description may practice the present invention as well.

Therefore, at least the following is claimed:

1. A method for recording to a storage medium in a personal video recorder (PVR) system, comprising:
    receiving a transport stream;
    storing the transport stream into a memory;
    generating an index table that provides information for locating particular frames recorded in the memory;
    configuring a video decoder for a timebase management mode in which the video decoder is configured to begin decoding after a video system time clock (STC) has been initialized;
    generating, by the video decoder configured in the timebase management mode, an interrupt for STC initialization, in response to detecting the first presentation time stamp (PTS) of a sequence of PTSs of the transport stream;
    initializing, after the interrupt, a video STC with a most recently received PTS of the transport stream, before using the video decoder to begin decoding of the transport stream; and
    begin decoding of the transport stream, using the video decoder, after the video STC has been initialized with the most recently received PTS.

2. The method according to claim 1, wherein the index table is adapted to point to start codes of the stored transport stream.

3. The method according to claim 1, wherein the index table is stored in a recording buffer.

4. The method according to claim 1, further comprising:
    transferring at least one of the stored transport stream or the index table from the memory to a storage unit.

5. The method according to claim 4, wherein transferring comprises employing a direct memory access (DMA) engine to transfer at least one of the stored transport stream or the index table from the memory to the storage unit.

6. The method according to claim 1, wherein the memory is configured as a linked list of descriptors, and the index table is written into the linked list of descriptors.

7. A method for playback from a storage media in a personal video recorder (PVR) system, comprising:
    programming a voltage controlled crystal oscillator (VCXO) to a nominal frequency;
    configuring a data transport engine to play back a transport stream from a memory;
    configuring a video decoder to decode with a throttle control;
    configuring the video decoder for a timebase management mode in which the video decoder is configured to begin decoding after a video system time clock (STC) has been initialized;
    generating, by the video decoder configured in the timebase management mode, an interrupt for STC initialization, in response to detecting the first presentation time stamp (PTS) of a sequence of PTSs of the transport stream;
    initializing, after the interrupt, a video STC with a most recently received PTS of the transport stream, before using the video decoder to begin decoding of the transport stream; and
    begin decoding of the transport stream, using the video decoder, after the video STC has been initialized with the most recently received PTS.

8. The method according to claim 7, further comprising:
    configuring an audio decoder to decode with the throttle control; and
    initializing an audio STC with the PTS.

9. The method according to claim 7, wherein programming comprises programming the VCXO to a nominal center frequency.

10. The method according to claim 7, wherein configuring the data transport engine further comprises configuring the data transport engine to playback data from a playback buffer in a unified synchronous dynamic random access memory (SDRAM).

11. The method according to claim 10, wherein at least one location of the playback buffer is configured as a linked list of descriptors.

12. The method according to claim 7, wherein the throttle control is adapted to ensure that a buffer does not underflow or does not overflow.

13. The method according to claim 7, wherein the video decoder includes a pause signal line, and the pause signal line is adapted to pause a flow of information from the data transport engine.

14. The method according to claim 7, wherein configuring the video decoder for the timebase management mode comprises configuring the video decoder to begin the decoding of the transport stream in the timebase management mode.

15. The method according to claim 7, wherein initializing the video STC further comprises interrupting a host so that the video STC can be initialized.

16. The method according to claim 7, wherein initializing the video STC further comprises configuring a timing recovery circuit to initialize the video STC.

17. A method for recording and playing simultaneously in a personal video recorder (PVR) system, comprising:
- configuring a data transport engine to record a transport stream;
- generating an index table that provides information for locating particular frames of the transport stream stored in a memory;
- controlling a voltage controlled crystal oscillator (VCXO) as a function of error between a program clock reference (PCR) in the transport stream and a serial PCR local system time clock (STC);
- configuring the data transport engine to play back the transport stream from the memory;
- configuring a video decoder to decode at different decoding rates;
- configuring a video decoder for a timebase management mode in which the video decoder is configured to begin decoding after a video STC has been initialized;
- generating, by the video decoder configured in the timebase management mode, an interrupt for STC initialization, in response to detecting the first presentation time stamp (PTS) of a sequence of PTSs of the transport stream;
- initializing, after the interrupt, the video STC with a most recently received PTS of the transport stream, before using the video decoder to begin decoding of the transport stream; and
- begin decoding of the transport stream, using the video decoder, after the video STC has been initialized with the most recently received PTS.

18. The method according to claim 17, further comprising:
- configuring an audio decoder to decode with different decoding rates; and
- updating an audio STC with the PTS.

19. The method according to claim 17, wherein the video decoder comprises a throttle control that is adapted to ensure that a buffer in a video decompression engine does not underflow or does not overflow.

20. The method according to claim 17, wherein controlling the VCXO further comprises controlling the VCXO as a function of error between the PCR in an original live broadcast stream and the serial PCR local STC.

* * * * *